United States Patent
Qiu et al.

(10) Patent No.: US 11,630,847 B2
(45) Date of Patent: Apr. 18, 2023

(54) SYNCHRONIZATION SYSTEM AND METHOD FOR SUBSTATION MONITORING BACKEND DATABASE, SCD, AND RCD

(71) Applicants: State Grid Fujian Electric Power Co., Ltd., Fujian (CN); State Grid Fujian Maintenance Company, Fujian (CN)

(72) Inventors: Jianbin Qiu, Fujian (CN); Xiuxia Zhang, Fujian (CN); Yueqing Chen, Fujian (CN); Jianhong Chen, Fujian (CN); Minjiang Chen, Fujian (CN); Zhihui Chen, Fujian (CN); Zhenxing Zhang, Fujian (CN)

(73) Assignees: State Grid Fujian Electric Power Co., Ltd., Fuzhou (CN); State Grid Fujian Maintenance Company, Fuzhou (CN)

( * ) Notice: Subject to any disclaimer, the term of this patent is extended or adjusted under 35 U.S.C. 154(b) by 156 days.

(21) Appl. No.: 17/252,313

(22) PCT Filed: Sep. 7, 2020

(86) PCT No.: PCT/CN2020/113854
§ 371 (c)(1),
(2) Date: Dec. 15, 2020

(87) PCT Pub. No.: WO2021/057459
PCT Pub. Date: Apr. 1, 2021

(65) Prior Publication Data
US 2021/0271693 A1 Sep. 2, 2021

(30) Foreign Application Priority Data
Sep. 29, 2019 (CN) .......................... 201910932554.8

(51) Int. Cl.
*G06F 16/27* (2019.01)
*G06F 16/23* (2019.01)

(52) U.S. Cl.
CPC ........ *G06F 16/275* (2019.01); *G06F 16/2365* (2019.01)

(58) Field of Classification Search
CPC .... G06F 16/275; G06F 16/2365; G06Q 50/06
See application file for complete search history.

(56) References Cited

U.S. PATENT DOCUMENTS 5,689,706 A * 11/1997 Rao .................. G06F 16/184
8,775,682 B1 * 7/2014 Mathias .............. G06F 16/273
709/248

(Continued)

FOREIGN PATENT DOCUMENTS

CN 103237065 A 8/2013
CN 103888253 A * 6/2014
(Continued)

*Primary Examiner* — Dennis Truong

(57) ABSTRACT

The present disclosure provides a synchronization system and method for a substation monitoring backend database, an SCD, and an RCD. The system includes: a synchronization token management unit, an SCD synchronization module, an RCD synchronization module, and a monitoring backend database synchronization module. The synchronization token management unit is configured to send or reclaim modification tokens, only at most one of which can exist at a time, and send a synchronization token.

8 Claims, 3 Drawing Sheets

(56) References Cited

U.S. PATENT DOCUMENTS

| | | | | |
|---|---|---|---|---|
| 2002/0099727 A1* | 7/2002 | Kadyk | ............... | G06F 9/546 |
| 2003/0217152 A1* | 11/2003 | Kasper, II | ............... | G06F 16/27 |
| | | | | 707/E17.007 |
| 2004/0215772 A1* | 10/2004 | Dinker | ............... | H04L 9/40 |
| | | | | 709/225 |
| 2005/0144312 A1* | 6/2005 | Kadyk | ............... | G06F 9/546 |
| | | | | 709/237 |
| 2005/0234943 A1* | 10/2005 | Clarke | ............... | H04L 67/131 |
| 2012/0303737 A1* | 11/2012 | Kazar | ............... | H04L 67/1097 |
| | | | | 709/213 |
| 2018/0101544 A1* | 4/2018 | Watson | ............... | H04L 67/1095 |

FOREIGN PATENT DOCUMENTS

| | | | | |
|---|---|---|---|---|
| CN | 103888253 A | | 6/2014 | |
| CN | 109754131 B | * | 5/2022 | |
| WO | WO-2004114043 A2 | * | 12/2004 | ......... H04L 41/0803 |
| WO | WO-2015158359 A1 | * | 10/2015 | ......... G06F 9/44505 |

\* cited by examiner

SYNCHRONIZATION SYSTEM AND METHOD FOR SUBSTATION MONITORING BACKEND DATABASE, SCD, AND RCD

FIELD

The present disclosure relates to the field of power system technologies, and more particular, to a synchronization system and method for signal information (tele-signalling, telemetry, and remote control) a substation monitoring backend database, an SCD, and an RCD based on an IEC61850 protocol.

BACKGROUND

With the development and application of intelligent stations, substation configuration description (SCD) files and remote configuration description (RCD) files have been included in the professional control category.

At present, synchronization methods for an SCD, an RCD, and a monitoring backend database in an intelligent substation perform modification mainly by manual operation. The SCD cannot be synchronously modified in real time when signal information in the monitoring backend database is modified. Such a separate manual modification cannot guarantee that modified data at both ends (a monitoring backend database file and an SCD file) is consistent, and differences before and after the modification cannot be seen. In this case, although an RCD file consistent with a monitoring system can be exported from the monitoring backend, signal information of the exported RCD file cannot be consistent with the SCD.

At the same time, since manual modification cannot guarantee the consistency between the SCD and the monitoring backend database file, the consistency between SCD and RCD files cannot be guaranteed.

Moreover, the monitoring backend database, SCD, and RCD monitoring information files cannot be kept consistent, so it is difficult to realize the promotion of coordination of a substation and a control master station based on the three files.

SUMMARY

In view of the defects and deficiencies in the prior art, the present disclosure provides a solution to solve the synchronization of signal information of an SCD, an RCD, and a monitoring backend database. In the solution, the synchronization trigger of the signal information of the three is defined as "a synchronization token." The "synchronization token" includes signal information needing to be modified and a modification path thereof, to ensure uniqueness and validity of the "synchronization token." A "modification token" is provided at the same time to initiate modification information. The modification token includes modified signal information, paths, modification directions. After confirmation is initiated for the "modification token" in each modification, the delivery of the "synchronization token" may be started. In this way, the synchronization of the signal information of the three is completed through the two "tokens". After implementation of the solution, the data synchronization accuracy of the three can be up to 100%, and the time saving rate can be more than 99%. This not only greatly improves the work efficiency, but also ensures the reliable and safe operation of the power grid.

The following technical solution is particularly adopted:

A synchronization system for a substation monitoring backend database, an SCD, and an RCD is provided, including: a synchronization token management unit, an SCD synchronization module, an RCD synchronization module, and a monitoring backend database synchronization module;

the synchronization token management unit is configured to send or reclaim, to or from the SCD synchronization module or the RCD synchronization module or the monitoring backend database synchronization module, modification tokens only at most one of which can exist at a time;

the SCD synchronization module or the RCD synchronization module and the monitoring backend database synchronization module being configured to, when data in an SCD file or an RCD file or a monitoring backend database needs to be modified, apply for a modification token to the synchronization token management unit, perform a modification operation and write the modification information into the modification token after acquiring the modification token, and then return the modification token to the synchronization token management unit; and the synchronization token management unit reclaims the modification token into which the modification information is written, and after the modification token passes verification, writes the modification information into the synchronization token, and sends the synchronization token to two synchronization modules which have not applied for a modification token for synchronous modification of the data.

Preferably, the modification token generated and sent by the synchronization token management unit includes information of the synchronization module applying for the modification token and information of the state in which modification is allowed.

Preferably, the two synchronization modules, which have not applied for a modification token, perform data positioning and modification after receiving the synchronization token, and upon completion of the modification, feed back modified information to the synchronization token management unit.

Preferably, the synchronization token management unit, upon completion of receiving the feedback of the modified information, notifies the SCD synchronization module, the RCD synchronization module, and the monitoring backend database synchronization module to perform self check before and after modification and generate difference information of the modification.

Preferably, in a period from the generation of the modification token by the synchronization token management unit to completion of receiving the feedback of the modified information, the synchronization token management unit does not generate a new modification token.

A synchronization method for a substation monitoring backend database, an SCD, and an RCD is provided. The method is based on a synchronization token management unit, an SCD synchronization module, an RCD synchronization module, and a monitoring backend database synchronization module; and the synchronization token management unit is configured to send or reclaim modification tokens, only at most one of which can exist at a time, and send a synchronization token;

the method includes the following steps:

step S1: applying for, by the SCD synchronization module, the RCD synchronization module, or the monitoring backend database synchronization module, a modification token to the synchronization token management unit;

step S2: sending, by the synchronization token management unit, the modification token according to the application when there is no ongoing synchronization task, the modification token including information of the synchronization module applying for the modification token and information of the state in which modification is allowed;

step S3: performing, by the synchronization module applying for the modification token, a modification operation and writing modification information into the modification token after acquiring the modification token, and then returning the modification token to the synchronization token management unit;

step S4: reclaiming, by the synchronization token management unit, the modification token into which the modification information is written, and after the modification token passes verification, writing the modification information into the synchronization token, and sending the synchronization token to two synchronization modules which have not applied for a modification token;

step S5: performing, by the two synchronization modules which have not applied for a modification token, data positioning and modification after receiving the synchronization token, and upon completion of the modification, feeding back modified information to the synchronization token management unit; and step S6: notifying, by the synchronization token management unit upon completion of receiving the feedback of the modified information, the SCD synchronization module, the RCD synchronization module, and the monitoring backend database synchronization module to perform self check before and after modification and generate difference information of the modification.

Preferably, in step S2, a standard for judging whether the synchronization token management unit has an ongoing synchronization task is: whether it is in a period from the generation of the modification token by the synchronization token management unit to completion of receiving the feedback of the modified information; and if the synchronization token management unit has an ongoing synchronization task, the application for the modification token enters a queuing state until the previous synchronization task has been completed.

Preferably, when data modification is rolled back: a historical modification token corresponding to a to-be-rolled-back data is retrieved through the synchronization token management unit and then a reverse synchronization operation is performed: the synchronization token management unit sends a synchronization token of reverse operation to the SCD, the RCD, and the monitoring backend database respectively, and generates a rollback operation record.

The present disclosure and its preferred solutions have the following beneficial effects:

(1) The setting of "tokens" ensures correctness and reliability of data synchronization. (2) The data synchronization accuracy can be up to 100%, and the time saving rate can be more than 99%. This not only greatly improves the work efficiency, but also ensures the reliable and safe operation of the power grid. (3) The consistency of the SCD, the RCD, and the monitoring backend database is achieved, guaranteeing the application and promotion of automatic coordination and automatic acceptance of a substation and a control master station.

BRIEF DESCRIPTION OF THE DRAWINGS

The present disclosure is described in further detail with reference to the accompanying drawings and specific implementations.

DETAILED DESCRIPTION

Figure 1:
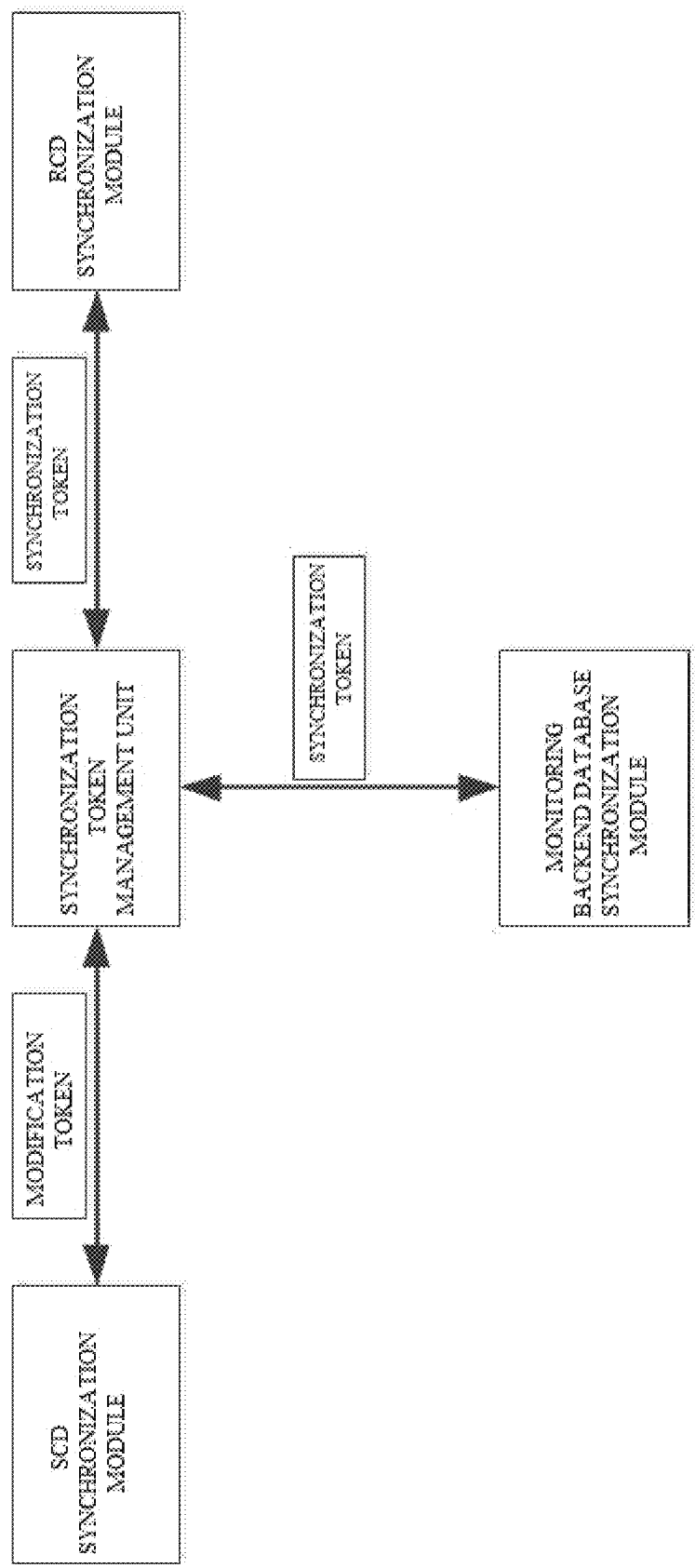
FIG. 1 is a schematic flowchart of modification synchronization of an SCD according to an embodiment of the present disclosure.
Figure 2:
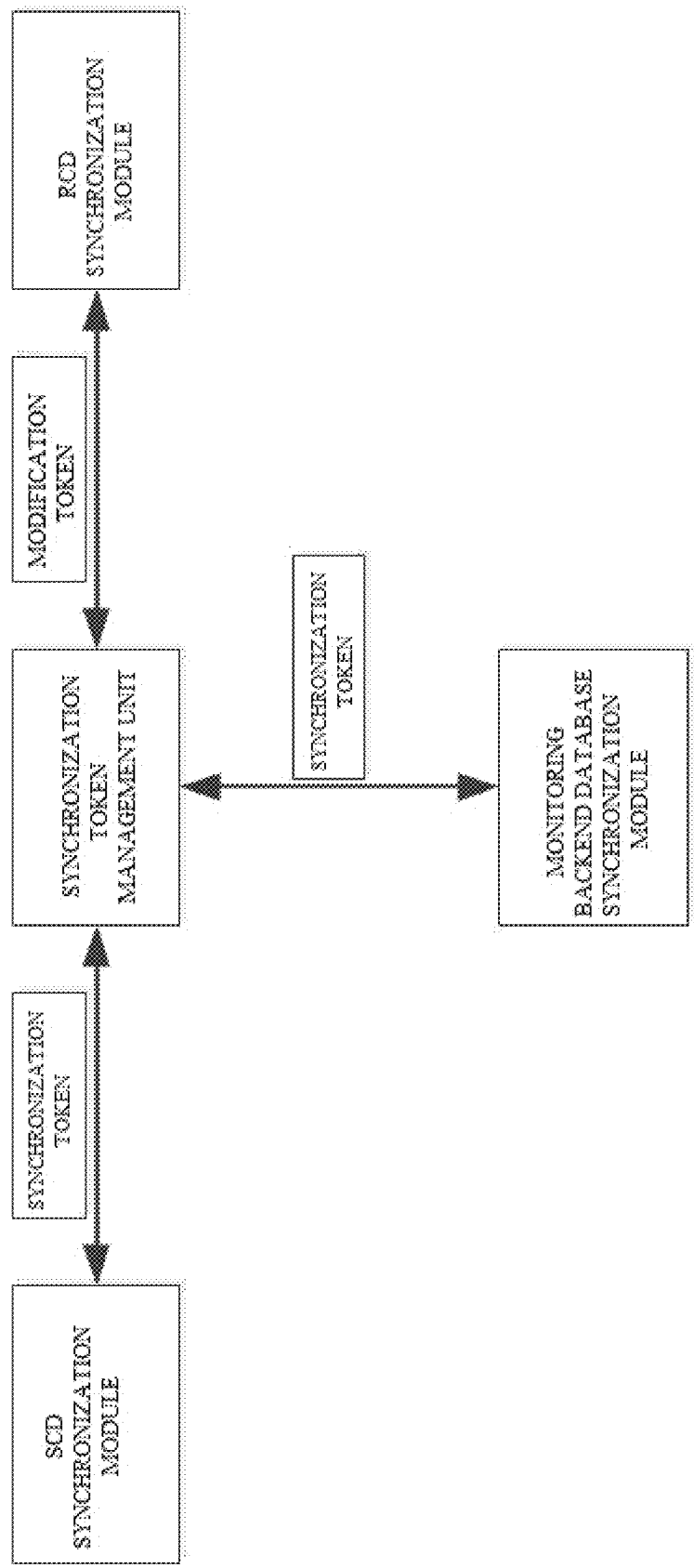
FIG. 2 is a schematic flowchart of modification synchronization of an RCD according to an embodiment of the present disclosure.
Figure 3:
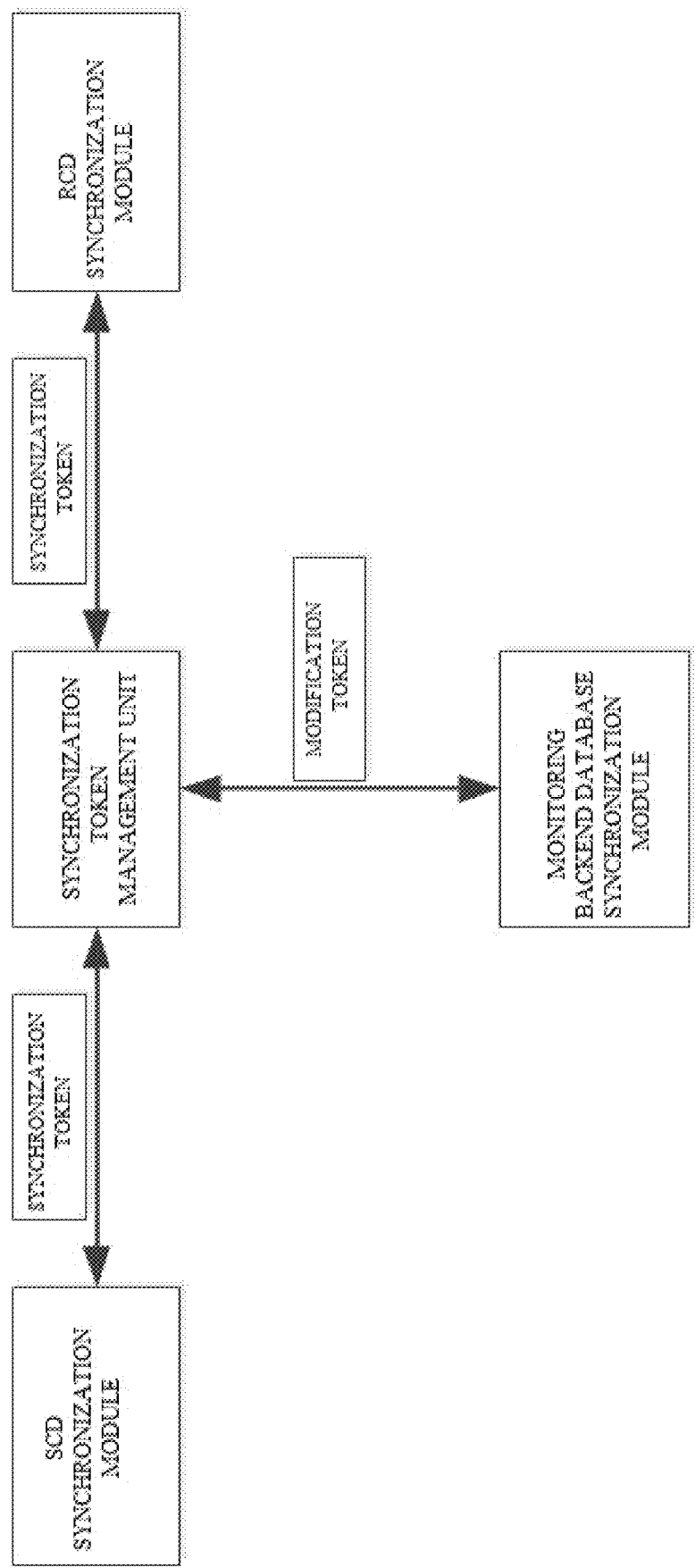
FIG. 3 is a schematic flowchart of modification synchronization of a monitoring backend database according to an embodiment of the present disclosure.

To enable features and advantages of the patent more obvious and understandable, detailed descriptions are provided as follows with reference to embodiments and the accompanying drawings:

As shown in FIG. 1 to FIG. 3, an initiator (an SCD or an RCD or a monitoring backend database) that needs to modify data applies for acquisition of a modification token to a synchronization token management unit. The synchronization token management unit generates only one modification token in a synchronization process. The modification token includes a to-be-modified module and its state of allowing modification. When modified, the SCD or RCD or monitoring backend database needs to perform modification authorization in a manner of acquiring a modification token from the synchronization token management unit. This ensures unified modification time and modification uniqueness.

This is based on the architecture of a newly provided synchronization system consisting of a synchronization token management unit, an SCD synchronization module, an RCD synchronization module, and a monitoring backend database synchronization module.

As shown in FIG. 1, after the SCD synchronization module acquires a modification token, modification to the SCD is allowable. Upon completion of the modification, the modification token with modification information is returned to the synchronization token management unit. The synchronization token management unit verifies the modification token after receiving the modification token, and after the modification token passes the verification, sends a synchronization token to the RCD synchronization module and the monitoring backend database synchronization module, and simultaneously modifies corresponding information description. The RCD synchronization module and the monitoring backend database synchronization module perform data positioning and modification after receiving the synchronization token, and upon completion of the modification, feed back modified information to the synchronization token management unit. The synchronization token management unit, after receiving the feedback of the modified information, notifies the SCD synchronization module, the RCD synchronization module, and the monitoring backend database synchronization module to perform self check before and after modification and acquire difference information of the modification for display to a user.

As shown in FIG. 2, after the RCD synchronization module acquires the modification token, it is allowed to modify the RCD. After the modification is completed, the modification token with modification information is returned to the synchronization token management unit. The synchronization token management unit verifies the modification token after receiving the modification token, and after the modification token passes the verification, sends a synchronization token to the SCD synchronization module and the monitoring backend database synchronization module, and simultaneously modifies corresponding information description. The SCD synchronization module and the monitoring backend database synchronization module perform data positioning and modification after receiving the synchronization token, and upon completion of the modification, feed back modified information to the synchronization token management unit. The synchronization token management unit, after receiving the feedback of the modified information, notifies the SCD synchronization module, the RCD synchronization module, and the monitoring backend database synchronization module to perform self check before and after modification and acquire difference information of the modification for display to a user.

A modification synchronization method for a monitoring backend database in FIG. 3 is basically the same as the synchronization methods shown in FIG. 1 and FIG. 2.

Through the design of the solution of this embodiment, the rollback of the data modification can also be performed through the synchronization token management unit. The synchronization token management unit retrieves a historical modification token and then performs a reverse synchronization operation: the synchronization token management unit sends a synchronization token of reverse operation to the SCD, the RCD, and the monitoring backend database respectively, which not only achieves a purpose of a rollback operation but also generates a rollback operation record.

The patent is not limited to the above optimal implementations. Under the inspiration of the patent, anyone can obtain various other forms of synchronization system and methods for a substation monitoring background database, an SCD, and an RCD. Any equivalent changes and modifications made within the scope of the claims of the present disclosure all come within the scope of the patent.

The invention claimed is:

1. A synchronization system for a substation monitoring backend database, a substation configuration description (SCD), and a remote configuration description (RCD), comprising: a synchronization token management unit, an SCD synchronization module, an RCD synchronization module, and a monitoring backend database synchronization module;
the synchronization token management unit being configured to send or reclaim, to or from the SCD synchronization module or the RCD synchronization module or the monitoring backend database synchronization module, modification tokens for initiating modification information, only at most one of the modification tokens existing at a time; wherein the modification token is generated by the synchronization token management unit;
the SCD synchronization module or the RCD synchronization module or the monitoring backend database synchronization module being configured to, when data in an SCD file or an RCD file or a monitoring backend database needs to be modified, apply for the modification token to the synchronization token management unit, perform a modification operation and write the modification information into the modification token after acquiring the modification token, and then return the modification token to the synchronization token management unit; and
the synchronization token management unit reclaiming the modification token into which the modification information is written, and after the modification token passes verification, writing the modification information into a synchronization token for signal information synchronization triggering of the monitoring backend database, the SCD, and the RCD, and sending the synchronization token to two synchronization modules, which have not applied for the modification token, for synchronous modification of the data.

2. The synchronization system for the substation monitoring backend database, the SCD, and the RCD according to claim 1, wherein the modification token generated and sent by the synchronization token management unit comprises information of the synchronization module applying for the modification token and information of state in which modification is allowed.

3. The synchronization system for the substation monitoring backend database, the SCD, and the RCD according to claim 1, wherein after receiving the synchronization token, the two synchronization modules, which have not applied for a modification token, perform data positioning and modification, and upon completion of the modification, feed back modified information to the synchronization token management unit.

4. The synchronization system for the substation monitoring backend database, the SCD, and the RCD according to claim 3, wherein upon completion of receiving the feedback of the modified information, the synchronization token management unit notifies the SCD synchronization module, the RCD synchronization module, and the monitoring backend database synchronization module to perform self check before and after modification and generate difference information of the modification.

5. The synchronization system for the substation monitoring backend database, the SCD, and the RCD according to claim 4, wherein in a period from the generation of the modification token by the synchronization token management unit to the completion of receiving the feedback of the modified information, the synchronization token management unit does not generate a new modification token.

6. A synchronization method for a substation monitoring backend database, a substation configuration description (SCD), and a remote configuration description (RCD), wherein the method is based on a synchronization token management unit, an SCD synchronization module, an RCD synchronization module, and a monitoring backend database synchronization module; and the synchronization token management unit is configured to send or reclaim modification tokens, only at most one of which can exist at a time, and send a synchronization token;
the method comprising the following steps:
step S1: applying for, by the SCD synchronization module, the RCD synchronization module, or the monitoring backend database synchronization module, a modification token to the synchronization token management unit; wherein the modification token is generated by the synchronization token management unit;
step S2: sending, by the synchronization token management unit, the modification token according to the application when there is no ongoing synchronization task, the modification token comprising information of the synchronization module applying for the modification token and information of state in which modification is allowed;
step S3: performing, by the synchronization module applying for the modification token, a modification operation and writing modification information into the modification token after acquiring the modification token, and then returning the modification token to the synchronization token management unit;
step S4: reclaiming, by the synchronization token management unit, the modification token into which the modification information is written, and after the modification token passes verification, writing the modification information into the synchronization token, and sending the synchronization token to two synchronization modules which have not applied for the modification token;

step S5: performing, by the two synchronization modules which have not applied for a modification token, data positioning and modification after receiving the synchronization token, and upon completion of the modification, feeding back modified information to the synchronization token management unit; and step S6: notifying, by the synchronization token management unit upon completion of receiving the feedback of the modified information, the SCD synchronization module, the RCD synchronization module, and the monitoring backend database synchronization module to perform self check before and after modification and generate difference information of the modification.

7. The synchronization method for the substation monitoring backend database, the SCD, and the RCD according to claim 6, wherein in step S2, a standard for judging whether the synchronization token management unit has an ongoing synchronization task is: whether it is in a period from the generation of the modification token by the synchronization token management unit to completion of receiving the feedback of the modified information; and if the synchronization token management unit has an ongoing synchronization task, the application for the modification token enters a queuing state until the previous synchronization task has been completed.

8. The synchronization method for the substation monitoring backend database, the SCD, and the RCD according to claim 6, wherein when data modification is rolled back: a historical modification token corresponding to a to-be-rolled-back data is retrieved through the synchronization token management unit and then a reverse synchronization operation is performed: the synchronization token management unit sends a synchronization token of reverse operation to the SCD, the RCD, and the monitoring backend database respectively, and generates a rollback operation record.

* * * * *